United States Patent
Chiang (10) Patent No.: US 11,305,361 B1
(45) Date of Patent: Apr. 19, 2022

(54) SAW TOOL

(71) Applicant: SHIN YING ENTPR CO., LTD., Taichung (TW)

(72) Inventor: Wen-Hung Chiang, Taichung (TW)

(73) Assignee: SHIN YING ENTPR CO., LTD., Taichung (TW)

( * ) Notice: Subject to any disclaimer, the term of this patent is extended or adjusted under 35 U.S.C. 154(b) by 0 days.

(21) Appl. No.: 17/034,675

(22) Filed: Sep. 28, 2020

(51) Int. Cl.
  *B23D 51/16* (2006.01)
  *B23D 49/16* (2006.01)

(52) U.S. Cl.
  CPC ........... *B23D 51/16* (2013.01); *B23D 49/162* (2013.01)

(58) Field of Classification Search
  CPC ...... B23D 51/16; B23D 49/162; B23D 49/16; F16H 25/12; B25F 3/00; B25F 5/01; B25F 5/02
  USPC ................................................ 30/392; 74/57
  See application file for complete search history.

(56) References Cited

U.S. PATENT DOCUMENTS

| | | | | |
|---|---|---|---|---|
| 1,871,020 | A * | 8/1932 | Wyzenbeek | B23D 51/10 74/57 |
| 2,548,411 | A * | 4/1951 | Vache | B23D 59/006 74/57 |
| 2,816,583 | A * | 12/1957 | Hill | B23D 57/0076 30/374 |
| 3,260,289 | A * | 7/1966 | Whitten, Jr. | B23D 51/10 30/392 |
| 5,275,425 | A * | 1/1994 | Hessler | B25D 17/08 279/101 |
| 6,012,346 | A * | 1/2000 | Vo | B23D 51/16 30/392 |
| 7,134,508 | B2 * | 11/2006 | Prell | B23D 51/16 173/29 |

* cited by examiner

*Primary Examiner* — Nhat Chieu Q Do
(74) *Attorney, Agent, or Firm* — Muncy, Geissler, Olds & Lowe, PC (57) ABSTRACT

A saw tool is provided, including: a rotatable member, a first end portion of the rotatable member being configured to be connected with a power source, a second end portion of the rotatable member including an insertion hole; and a driven assembly, driven by the rotatable member to be reciprocatably movable relative to the rotatable member; wherein the driven assembly includes a first end portion and a second end portion opposite to the first end portion, the first end portion being configured to be connected with a driving tool, the second end portion being slidably received within the insertion hole.

6 Claims, 8 Drawing Sheets

SAW TOOL

BACKGROUND OF THE INVENTION

Field of the Invention

The present invention relates to a saw tool.

Description of the Prior Art

A conventional saw is mainly driven by a motor to rotate a rotational member, and converts the power into a force that allows the output shaft to reciprocate, so as to drive the cutter connected to the output shaft. The rotational member and the output shaft can move relatively, the output shaft can be driven by the rotational member to convert the rotating force into reciprocating force; however, the rotating force of the rotational member cannot be completely converted into the reciprocating force, which causes deflection and vibration of the cutter during reciprocating motion of the output shaft. As a result, it is difficult to cut materials smoothly.

The present invention is, therefore, arisen to obviate or at least mitigate the above-mentioned disadvantages.

SUMMARY OF THE INVENTION

The main object of the present invention is to provide a saw tool which has a simple structure, is easy to manufacture, and can stabilize operation and reduce shaking.

To achieve the above and other objects, a saw tool is provided, including: a rotatable member, a first end portion of the rotatable member being configured to be connected with a power source, a second end portion of the rotatable member including an insertion hole; and a driven assembly, driven by the rotatable member to be reciprocatably movable relative to the rotatable member; wherein the driven assembly includes a first end portion and a second end portion opposite to the first end portion, the first end portion being configured to be connected with a driving tool, the second end portion being slidably received within the insertion hole.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 8 for a preferable embodiment of the present invention. A saw tool 1 of the present invention includes a shell body 10, a rotatable member 20 and a driven assembly 300.

The saw tool 1 may be a pneumatic or electric reciprocating saw tool. The shell body 10 includes at least one receiving hole 11, the first end portion of the rotatable member 20 is configured to be connected with a power source 2, and the second end portion of the rotatable member 20 includes an insertion hole 24. The driven assembly 300 is driven by the rotatable member 20 to be reciprocatably movable relative to the rotatable member 20. The driven assembly 300 includes a first end portion 31 and a second end portion 32 opposite to the first end portion 31, the first end portion 31 of the driven assembly 300 is configured to be connected with a driving tool 3 such as a saw blade. The second end portion 32 of the driven assembly 300 slidably received within the insertion hole 24. The driven assembly 300 includes a shaft member 30 which includes first end portion 31 and the second end portion 32 of the driven assembly 300, and thus the driven assembly 300 can reciprocate stably so as to avoid deviation and/or shaking of the saw blade.

Figure 1:
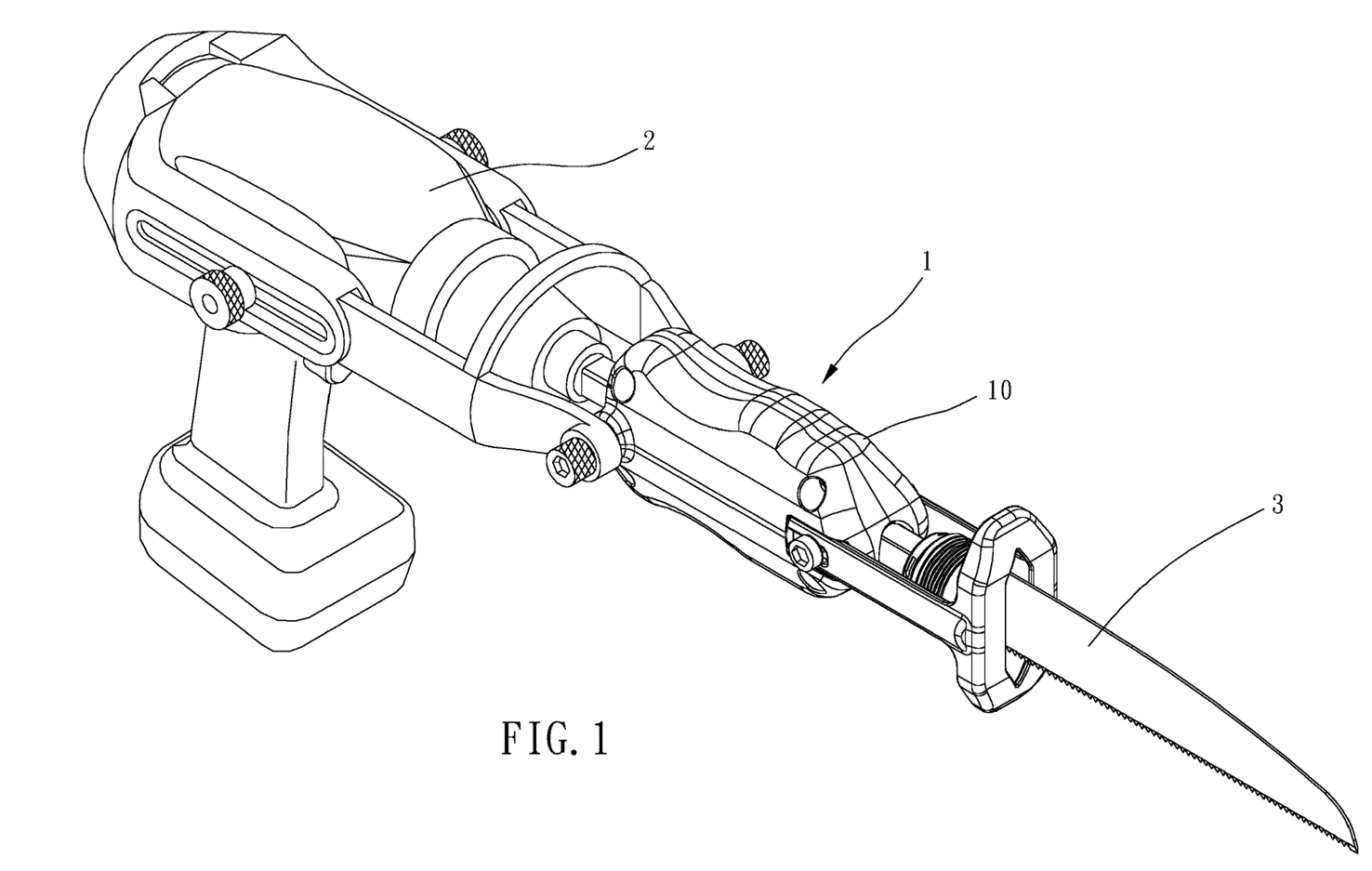
FIG. 1 is a drawing showing an application of a preferable embodiment of the present invention.
Figure 2:
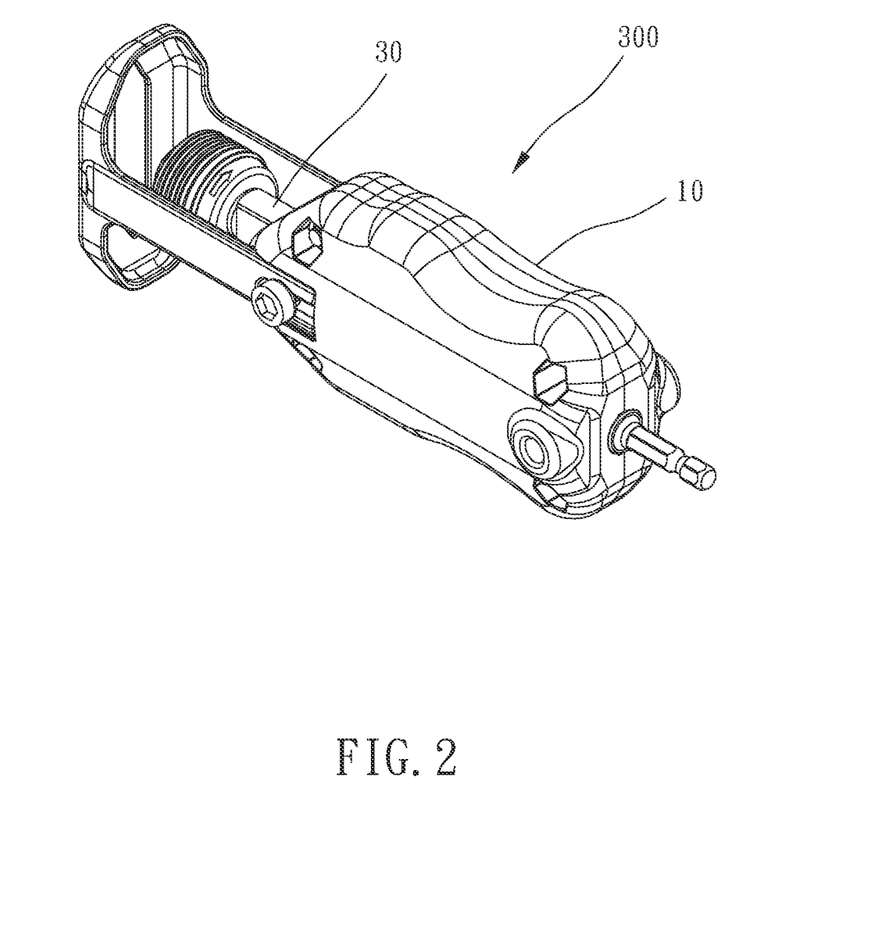
FIG. 2 is a stereogram of a preferable embodiment of the present invention.
Figure 3:
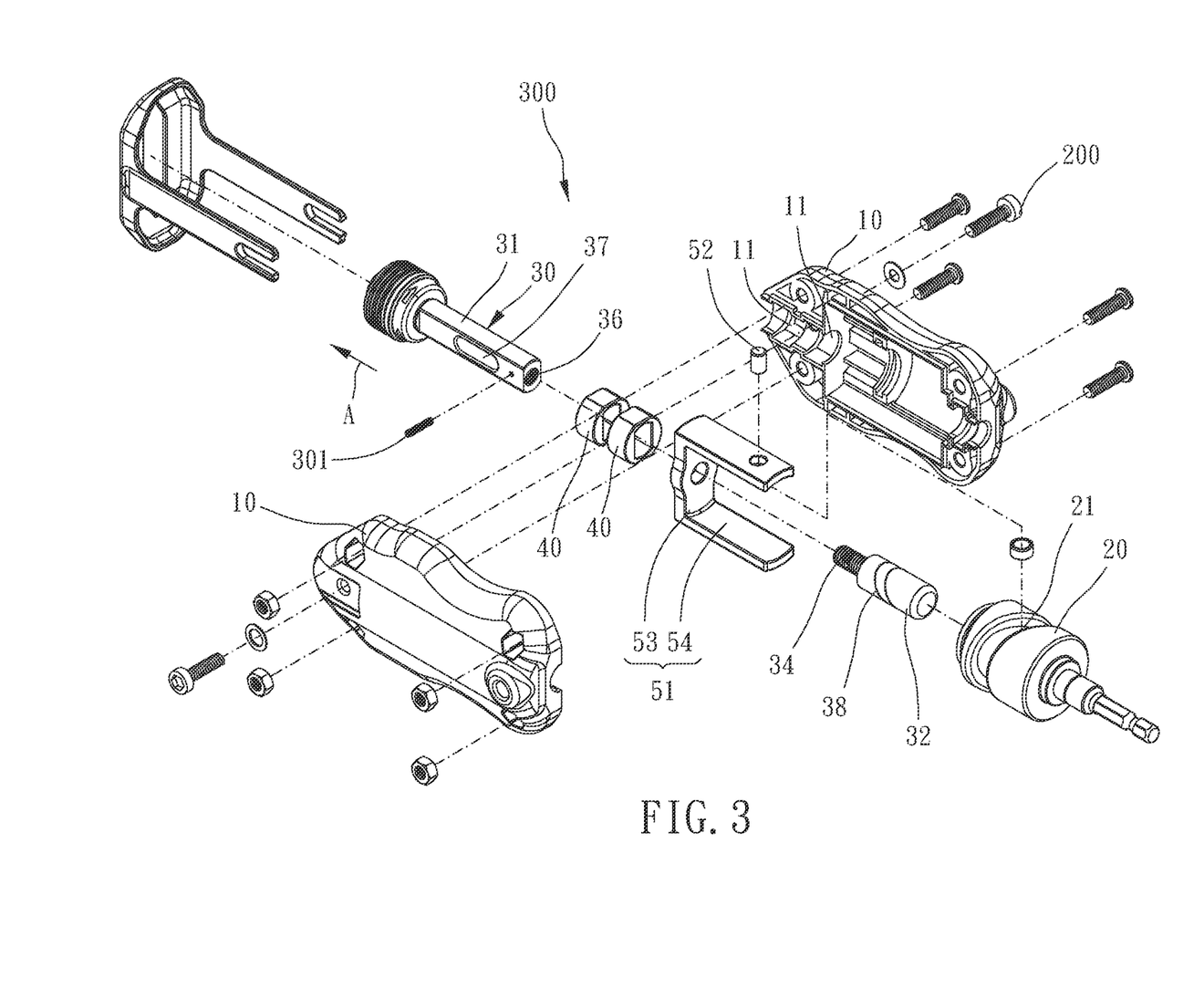
FIG. 3 is a breakdown drawing of a preferable embodiment of the present invention.

The first end portion 31 of the driven assembly 300 and the second end portion 32 of the driven assembly 300 are detachably connected with each other. One of the first end portion 31 of the driven assembly 300 and the second end portion 32 of the driven assembly 300 includes a threaded shaft 34, and the other of the first end portion 31 of the driven assembly 300 and the second end portion 32 of the driven assembly 300 includes a threaded hole 36 with which the threaded shaft 34 is screwed, which is easy to assemble/disassemble and/or replace, and is stable. Preferably, the driven assembly 300 further includes an insert connector, the insert connector is inserted in the first end portion 31 of the driven assembly 300 and the second end portion 32 of the driven assembly 300 and inserted within the threaded hole 36 and the threaded shaft 34. The insert connector may be a set screw 301 screwed to the threaded shaft 34 and within the threaded hole 36, which enhancing combination of elements. Preferably, the second end portion 32 of the driven assembly 300 includes at least one grooved recess 38 disposed therearound. In this embodiment, the second end portion 32 of the driven assembly 300 includes a plurality of said grooved recesses 38 disposed therearound, each of the plurality of said grooved recesses 38 extends annularly, thus providing smooth movement and operation.

Figure 4:
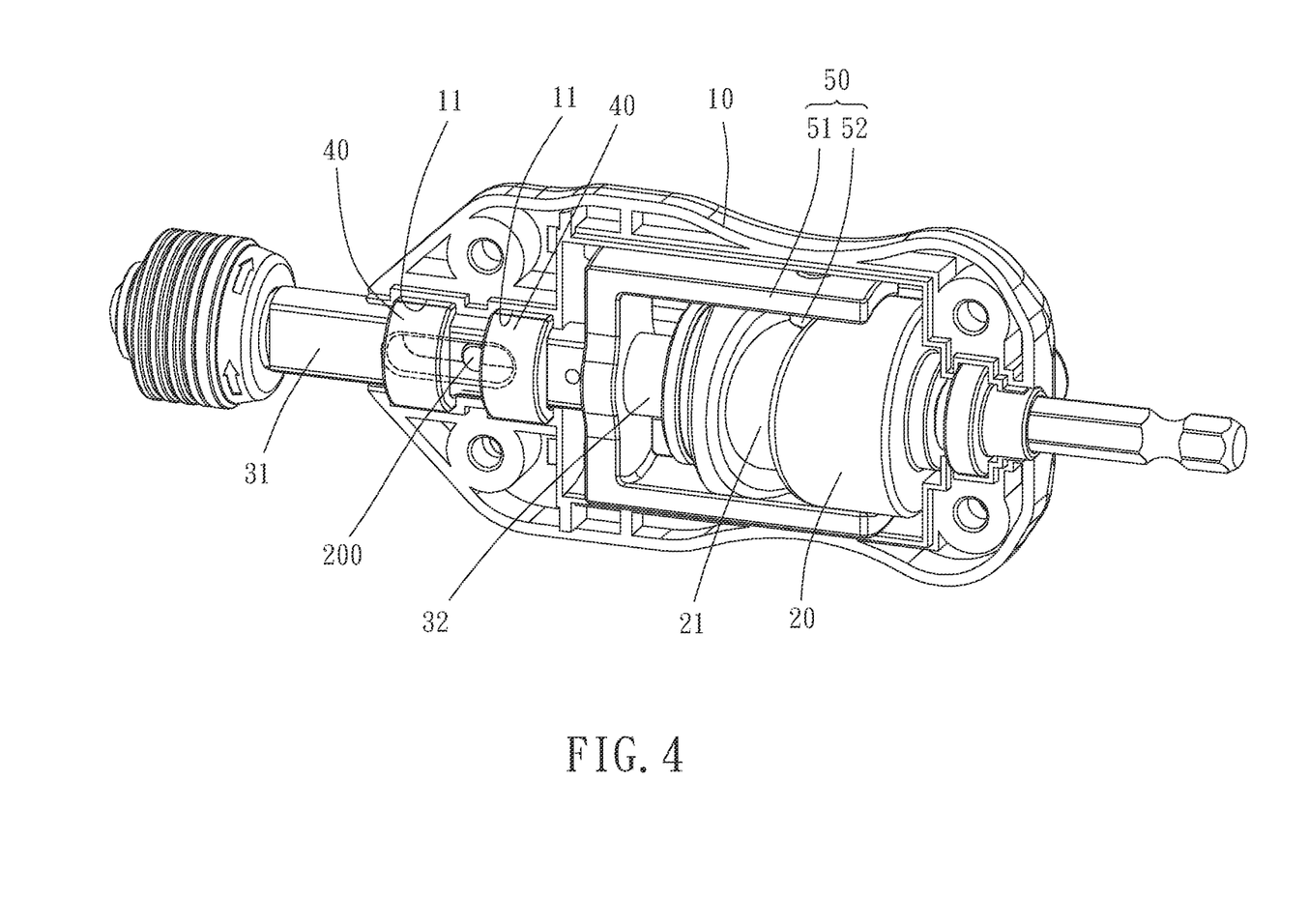
FIG. 4 is a drawing showing partial structure of a preferable embodiment of the present invention.

The insertion hole 24 has an axial dimension A1, the second end portion 32 of the driven assembly 300 is inserted in the insertion hole 24 for a distance larger than ⅓ the axial dimension A1 of the insertion hole 24, which can stabilize operation and reduce shaking.

Figure 5:
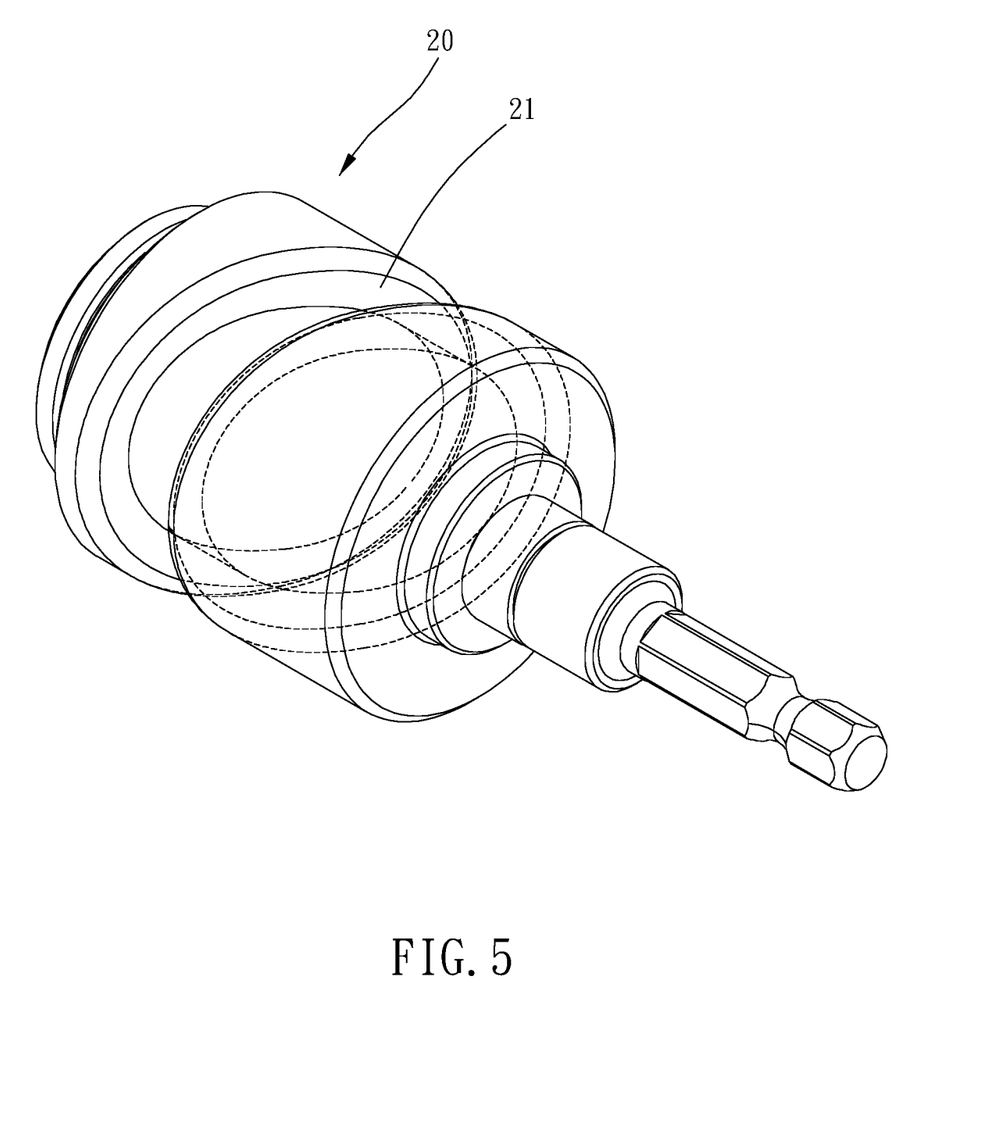
FIG. 5 is a stereogram of a rotatable member according to a preferable embodiment of the present invention.
Figure 6:
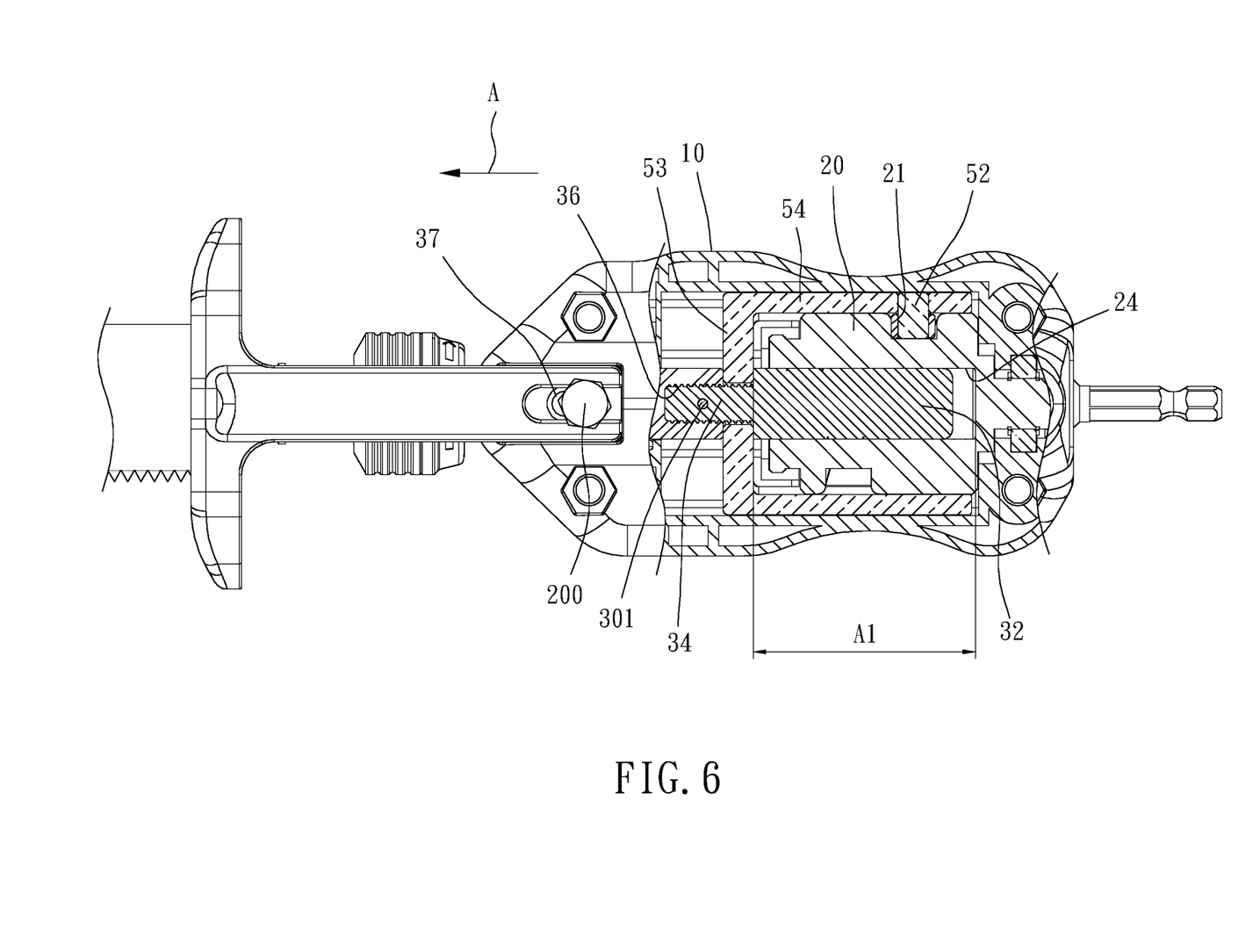
FIGS. 6 and 7 are drawings showing of reciprocating operation of a preferable embodiment of the present invention.
Figure 7:
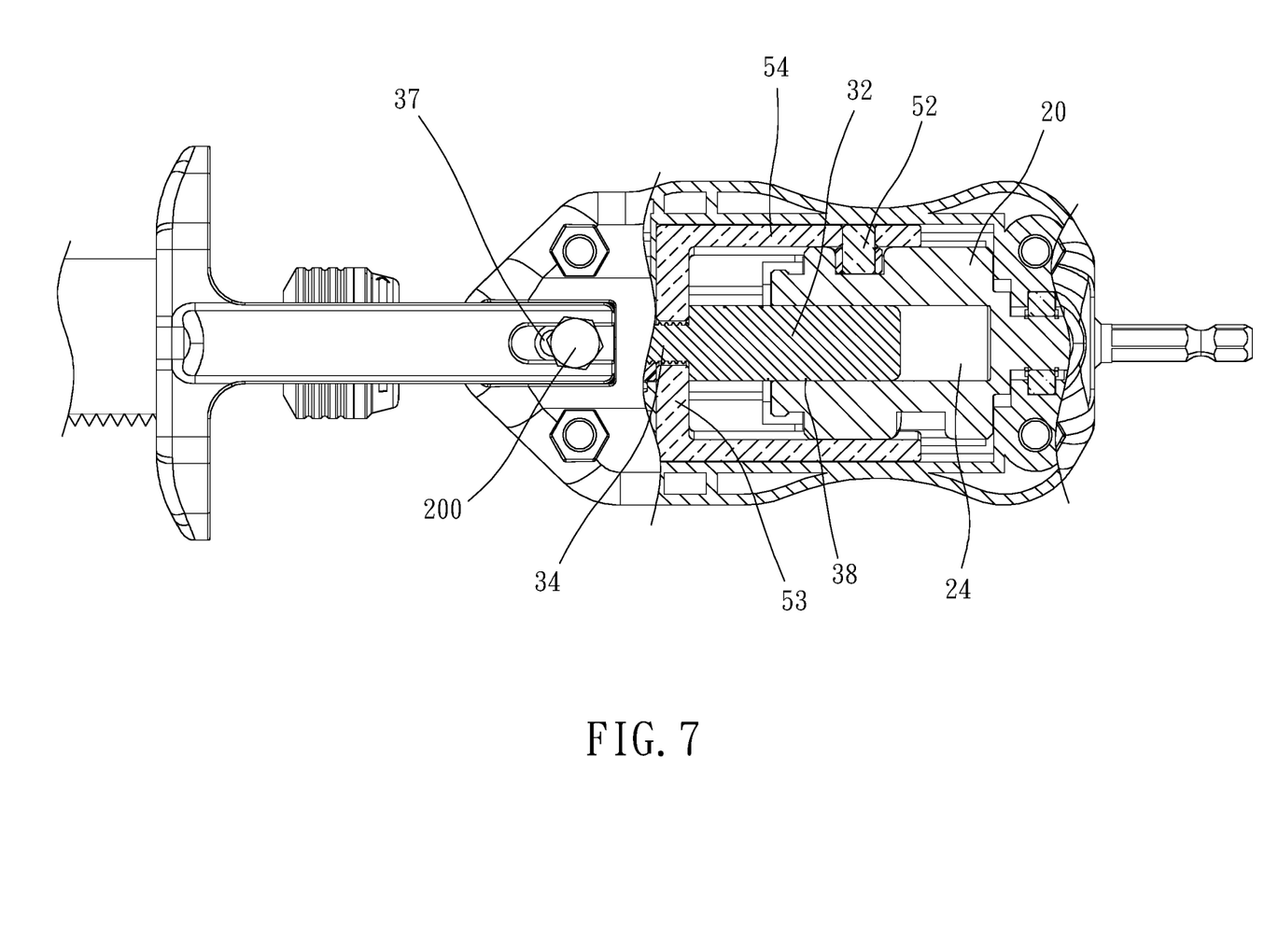
Figure 8:
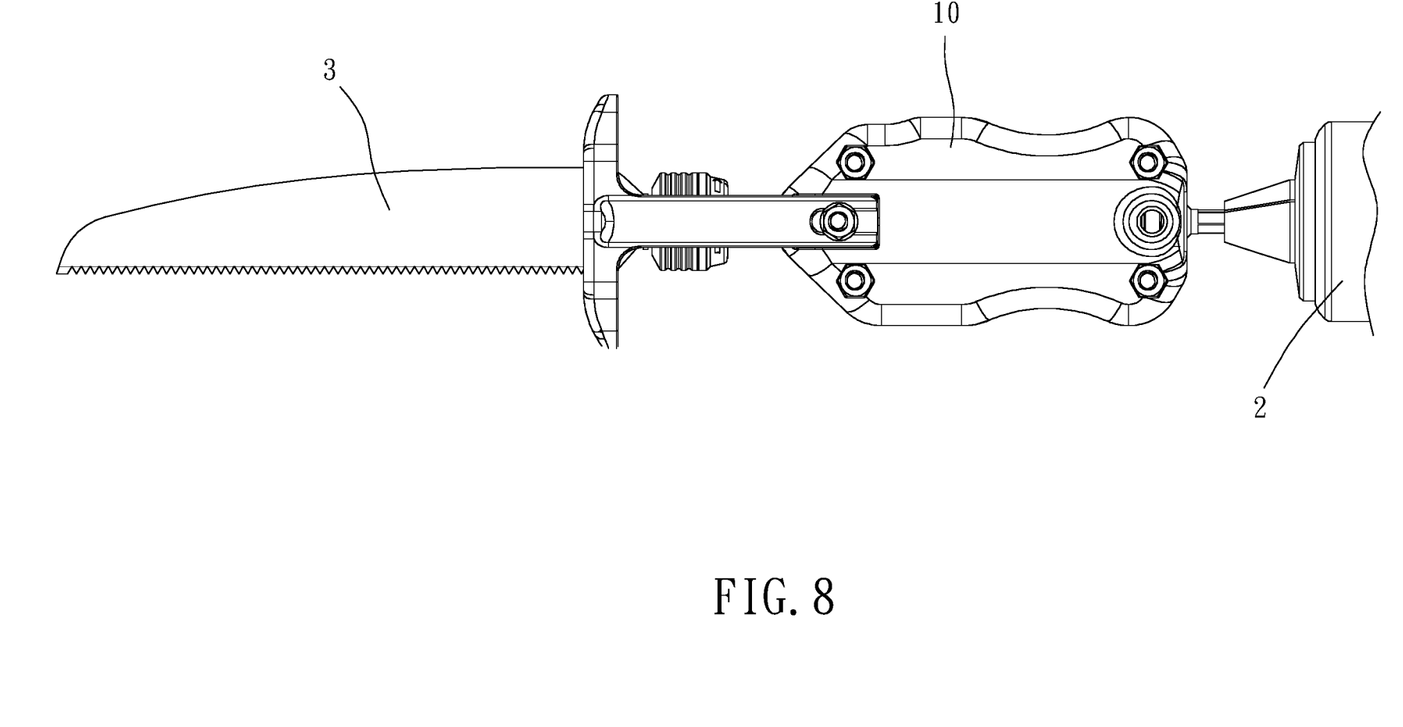
FIG. 8 is a drawing showing another application of a preferable embodiment of the present invention.

The rotatable member 20 extends in an axial direction A, the rotatable member 20 includes a guide groove 21, and the guide groove 21 is in the form of a close loop around the axial direction A. The saw tool 1 further includes a linkage member 50, and the linkage member 50 includes a main body 51 and at least one slidable member 52. The first end portion 31 of the driven assembly 300 and the second end portion 32 of the driven assembly 300 are connected with the main body 51, and each said slidable member 52 is disposed on the main body 51. Specifically, the main body 51 a U-shaped frame, the main body 51 includes a connection section 53 and two arm sections 54 connected to the connection section 53 in interval. The connection section 53 includes a through hole 55, the threaded shaft 34 is disposed through the through hole 55, and at least one of the two arm sections 54 includes one said slidable member 52. The main body 51 is disposed around the rotatable member 20, and the two arm sections 54 are located at two opposite sides of the rotatable member 20, for easy assembling/disassembling.

Each said restriction member 40 is disposed in one said receiving hole 11, each said restriction member 40 is disposed between the at least one receiving hole 11 and the first end portion 31 of the driven assembly 300, and each said restriction member 40 is un-rotatable relative to the receiving hole 11. Each said slidable member 52 is located out of the at least one restriction member 40, which can mitigate wearing of the shell body 10.

The saw tool 1 further includes a position-limiting accessory 200 fixedly connected to the shell body 10. In this embodiment, the position-limiting accessory 200 is a threaded rod, and the first end portion 31 of the shaft member 30 includes an elongate slot 37 extending axially. An end of the position-limiting accessory 200 is movably inserted within the elongate slot 37.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A saw tool, including:
 a rotatable member, a first end portion of the rotatable member being configured to be connected with a power source, a second end portion of the rotatable member including an insertion hole; and
 a driven assembly, driven by the rotatable member to be reciprocatably movable relative to the rotatable member,
 wherein the driven assembly includes a first end portion and a second end portion opposite to the first end portion, the first end portion being connected with a saw blade, the second end portion being slidably received within the insertion hole,
 wherein the first end portion of the driven assembly and the second end portion of the driven assembly are detachably connected with each other,
 wherein one of the first end portion of the driven assembly and the second end portion of the driven assembly includes a threaded shaft, and the other of the first end portion of the driven assembly and the second end portion of the driven assembly includes a threaded hole with which the threaded shaft is screwed,
 wherein the rotatable member extends in an axial direction, the rotatable member includes a guide groove, the guide groove is in a form of a close loop around the axial direction, the driven assembly further includes a linkage member, the linkage member includes a main body and at least one slidable member, the first end portion and the second end portion are connected with the main body, and each of the at least one slidable member is disposed on the main body, and
 wherein the main body is a U-shaped frame, the main body includes a connection section and two arm sections connected to the connection section in interval, the connection section includes a through hole, the threaded shaft is disposed through the through hole, at least one of the two arm sections includes one of the at least one slidable member, the main body is disposed around the rotatable member, and the two arm sections are located at two opposite sides of the rotatable member.

2. The saw tool of claim 1, wherein the driven assembly further includes an insert connector, the insert connector is inserted in the first end portion of the driven assembly and the second end portion of the driven assembly and inserted within the threaded hole and the threaded shaft.

3. The saw tool of claim 1, wherein the second end portion of the driven assembly includes at least one grooved recess disposed therearound.

4. The saw tool of claim 1, further including a shell body and at least one restriction member, the rotatable member and the driven assembly being disposed on the shell body, the shell body including at least one receiving hole, the at least one restriction member being disposed in the at least one receiving hole, the at least one restriction member being disposed between the at least one receiving hole and the first end portion of the driven assembly, the first end portion of the driven assembly being un-rotatable relative to the shell body, the at least one slidable member being located out of the at least one restriction member.

5. The saw tool of claim 1, further including a shell body and a position-limiting accessory connected to the shell body, the rotatable member and the driven assembly being disposed on the shell body, the first end portion of the driven assembly including an elongate slot extending axially, an end of the position-limiting accessory being inserted within the elongate slot.

6. A saw tool, including:
 a rotatable member, a first end portion of the rotatable member being configured to be connected with a power source, a second end portion of the rotatable member including an insertion hole; and
 a driven assembly, driven by the rotatable member to be reciprocatably movable relative to the rotatable member,
 wherein the driven assembly includes a first end portion and a second end portion opposite to the first end portion, the first end portion being connected with a saw blade, the second end portion being slidably received within the insertion hole,
 wherein the first end portion of the driven assembly and the second end portion of the driven assembly are detachably connected with each other,
 wherein one of the first end portion of the driven assembly and the second end portion of the driven assembly includes a threaded shaft, and the other of the first end portion of the driven assembly and the second end portion of the driven assembly includes a threaded hole with which the threaded shaft is screwed,
 wherein the rotatable member extends in an axial direction, the rotatable member includes a guide groove, the guide groove is in a form of a close loop around the axial direction, the driven assembly further includes a linkage member, the linkage member includes a main body and at least one slidable member, the first end portion and the second end portion are connected with the main body, and each of the at least one slidable member is disposed on the main body, and
 wherein the driven assembly further includes an insert connector, the insert connector is inserted in the first end portion of the driven assembly and the second end portion of the driven assembly and inserted within the threaded hole and the threaded shaft; the insert connector is a set screw or a pin; the second end portion of the driven assembly includes at least one grooved recess disposed therearound, each of the at least one grooved recess extends annularly; the insertion hole has an axial dimension, the second end portion of the driven assembly is inserted in the insertion hole for a distance larger than $\frac{1}{3}$ the axial dimension of the insertion hole; the main body is a U-shaped frame, the main body includes a connection section and two arm sections connected to the connection section in interval, the connection section includes a through hole, the threaded shaft is disposed through the through hole, at least one of the two arm sections includes one said slidable member, the main body is disposed around the rotatable member, and the two arm sections are located at two opposite sides of the rotatable member.

\* \* \* \* \*